United States Patent [19]
Hensiek et al.

[11] 3,880,061
[45] Apr. 29, 1975

[54] WORK STATION

[75] Inventors: Charles R. Hensiek, Moscow Mills; Rayford W. Timms, St. Louis, both of Mo.

[73] Assignee: American Air Filter Company, Inc., Louisville, Ky.

[22] Filed: Oct. 9, 1973

[21] Appl. No.: 404,395

[52] U.S. Cl............... 98/115 R; 98/36; 55/DIG. 29
[51] Int. Cl............................................. F23j 11/08
[58] Field of Search ............ 98/36, 115 LH, 115 R; 55/467, 473, DIG. 29

[56] References Cited
UNITED STATES PATENTS

| | | | |
|---|---|---|---|
| 1,392,870 | 10/1921 | Fessler | 98/36 |
| 2,074,317 | 3/1937 | Allan et al. | 98/115 R X |
| 3,686,836 | 8/1972 | Rabilloud et al. | 98/115 LH |

Primary Examiner—Meyer Perlin
Assistant Examiner—Ronald C. Capossela

[57] ABSTRACT

A contamination-free work station having a work surface with means for moving an air stream across the work surface to remove any contaminants evolving from the work surface and means for removing the contaminants from the flowing air stream.

6 Claims, 1 Drawing Figure

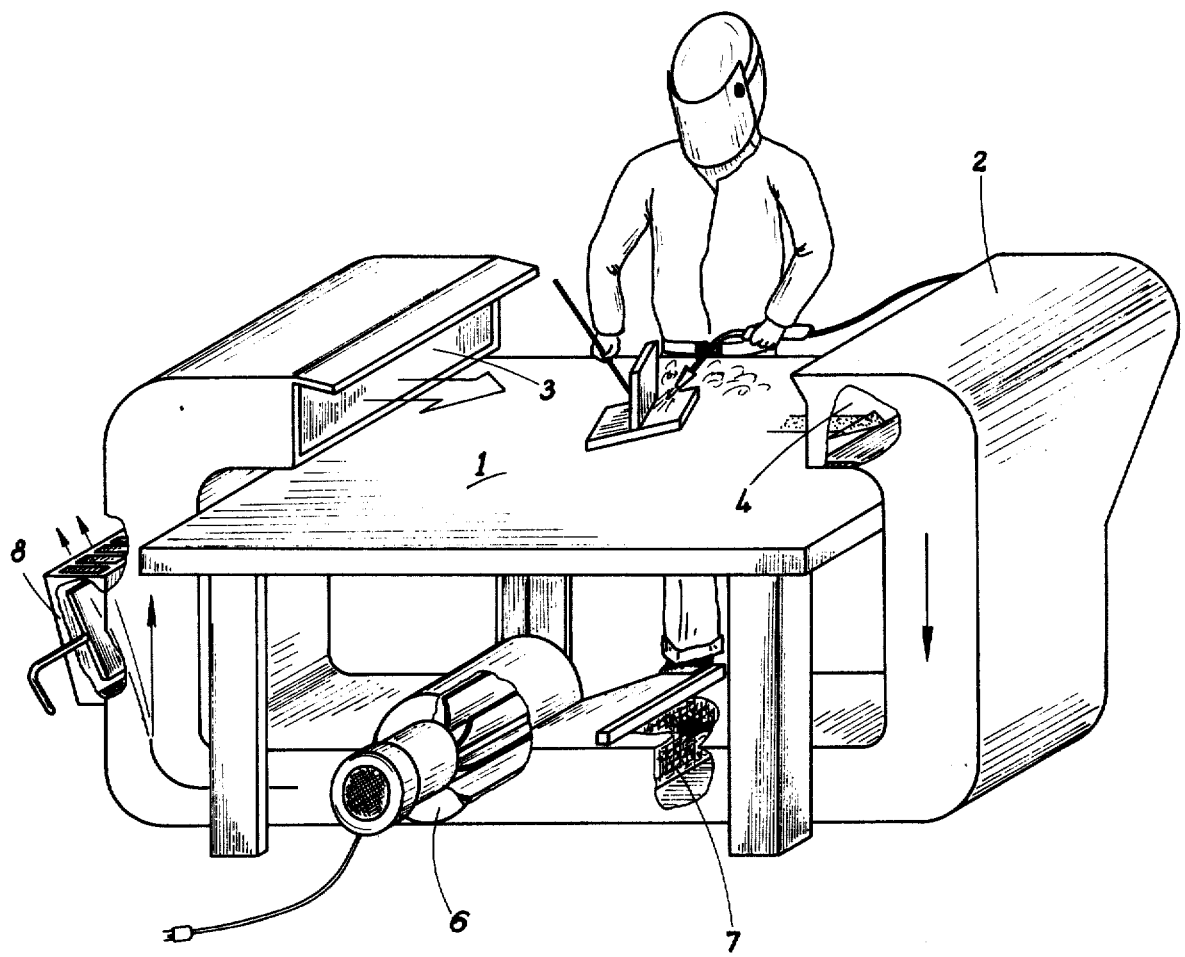

WORK STATION

BACKGROUND OF THE INVENTION

This invention relates to contaminant-free work stations and more particularly to a work station wherein contaminants evolving from the work area are removed therefrom by flowing air passing across the work area.

In order to reduce or remove noxious gases and vapors from a work surface, such as a welding work bench or the like, several different ideas have been porposed to eliminate these contaminants or significantly cut down their concentration from being brought in contact with respiratory organs and eyes of persons working in the work areas. Specifically, in welding operations several different arrangements have been proposed. For example, one method for removing the aforementioned contaminants is a water-cooled hood which is extended over the welding torch and along the line of weld to remove the gases and products of combustion which are evolved in the welding operation. Another device is a work bench with openings through which the gases and vapors are drawn off in a downward direction. Even another means utilized is a suction bonnet above the working station to draw off the gases and vapors.

SUMMARY OF THE INVENTION

In the present invention, it is recognized that it is desirable to provide a work station to reduce or remove contaminants evolving from a work area in the work station. It is further recognized that it is desirable to provide a work station which includes means for removing contaminants evolving therefrom and prevent a detrimental effect to the eyes and respiratory organs of a workman at the work station.

The present invention advantageously provides a straightforward arrangement for a work station which may be utilized for operations wherein contaminants are continually being evolved therefrom. The present invention further provides a work station for welding jobs and the like wherein a workman may work at the work station without being subjected to the contaminants evolving from the work station during the stated operation.

Various other features of the present invention will become obvious to those skilled in the art upon reading the disclosure set forth hereinafter.

More particularly, the present invention provides a work station comprising a work surface; an air duct with two openings therein, the openings being spaced from and mutually facing each other, the spacing between the openings being disposed at a preselected distance above the work surface; air moving means disposed in the duct whereby air is removed in an endless loop through the duct and across the work surface; and, means for removing contaminants from the air stream.

It is to be understood that the description of the examples of the present invention given hereinafter are not by way of limitation and various modifications within the scope of the present invention will occur to those skilled in the art upon reading the disclosures set forth hereinafter:

Referring to the drawing:

The FIGURE is a perspective view, partially cut away, of a work station of the present invention.

The work station of the present invention in the FIGURE includes a work table or surface 1 bounded on each side by air duct 2. Air duct 2 includes two openings therein, 3 and 4, opening 3 being in facing relationship with opening 4 and the openings 3 and 4 being at a preselected distance above the work surface 1 whereby a worker may stand and work at the work surface 1 and not expose respiratory organs and eyes to contaminated gases and vapors as they evolve from the work surface during work operations, such as a welding operation. Air duct 2' contains a blower 6 mounted therein to remove air from inlet 4 through the duct and in the direction of outlet opening 3. There is also provided within duct 2 a filter 7 for removing particulates which may be picked up in the air entering opening 4, the particulate material being entrained in the contaminated gases and vapors evolving from the work surface 1. Also provided is a damper operated outlet 8 which is utilized to remove contaminated air periodically thereby allowing room or fresh air to be brought into the system through opening 4. It is also realized that filter 7 may not be necessary in the duct, in which case the damper operated outlet 8 will be the means for removing contaminated air thereby preventing build-up of the contaminants in the air as it circulates through the duct and across the work surface.

In the operation of the work station in the present invention, the air duct 2 is generally of C-shaped cross-section wherein the openings 3 and 4, even though being spaced apart, are close enough together so that the air leaving opening 3 is substantially recycled into the duct 2 through opening 4. If the openings 3 and 4 are too far apart, the contaminated fumes evolving from the work surface 1 will not be picked up in the flowing air stream across the work surface and the operator will be subjected to these fumes as they pass upwardly along the eyes and respiratory organs.

It will be realized that various changes may be made to the specific embodiment shown and described without departing from the principles of the present invention.

What is claimed is:

1. A work station comprising: a work surface; an air duct of C-shaped cross-section with two openings therein, said openings being spaced from and mutually facing each other, the spacing between said openings being disposed at a preselected distance above said work surface; air moving means disposed in said duct whereby air is moved in an endless loop through said duct and across the top of said work surface at a preselected distance above said work surface; and, means for removing contaminants from said air stream.

2. The work station of claim 1 including filter means in said air duct.

3. The work station of claim 1 wherein said openings in said air duct being at a preselected distance above said work surface are at a preselected distance below the respiratory organs and eyes of a workman working at said station.

4. The work station of claim 1 wherein said openings in said air duct are at preselected distances apart extending along the length of said work surface.

5. The work station of claim 1 wherein said openings are of substantially the same geometric configuration with approximately the same cross-sectional area.

6. The work station of claim 1 wherein said work surface is a welding table.

* * * * *